United States Patent
Iida

(10) Patent No.: US 7,102,662 B2
(45) Date of Patent: Sep. 5, 2006

(54) DATA SEQUENCE CONVERSION CIRCUIT AND PRINTER USING THE SAME

(75) Inventor: Masaru Iida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 967 days.

(21) Appl. No.: 09/839,370

(22) Filed: Apr. 23, 2001

(65) Prior Publication Data

US 2002/0085215 A1 Jul. 4, 2002

(30) Foreign Application Priority Data

Dec. 28, 2000 (JP) .............................. 2000-402150

(51) Int. Cl.
*B41J 2/435* (2006.01)
(52) U.S. Cl. ...................................... 347/237; 347/247
(58) Field of Classification Search ........ 347/237–238, 347/247, 142, 145, 235, 250; 209/565; 327/241; 345/100; 365/78, 189.03, 219–221, 238.5; 708/252–253; 711/104, 109; 370/470, 506
See application file for complete search history.

(56) References Cited

U.S. PATENT DOCUMENTS

| | | | | |
|---|---|---|---|---|
| 4,984,249 A | * | 1/1991 | Long et al. ................. | 375/293 |
| 6,763,036 B1 | * | 7/2004 | Maas et al. ................. | 370/470 |
| 6,891,424 B1 | * | 5/2005 | Hirata et al. ................ | 327/403 |
| 2002/0023191 A1 | * | 2/2002 | Fudeyasu .................... | 711/104 |

FOREIGN PATENT DOCUMENTS

| | | |
|---|---|---|
| JP | A 59-114551 | 7/1984 |
| JP | 02067665 A | 3/1990 |
| JP | A 4-207897 | 7/1992 |
| JP | A 7-137242 | 5/1995 |
| JP | 7156442 | 6/1995 |
| JP | A 7-156442 | 6/1995 |
| JP | A 7-178959 | 7/1995 |
| JP | A 11-254752 | 9/1999 |
| JP | A 11-340572 | 12/1999 |

* cited by examiner

*Primary Examiner*—Hai Pham
(74) *Attorney, Agent, or Firm*—Westerman, Hattori, Daniels & Adrian, LLP.

(57) ABSTRACT

Disclosed is a data sequence conversion circuit for converting a plurality of input data sequences having different data widths into output data sequences having a prescribed data width without converting the input data sequences into serial data. The data sequence conversion circuit, which takes as an input any one of a plurality of input data sequences having different data widths and converts the input data sequence into an output data sequence having a prescribed data width for output, includes: a first parallel shift register for holding the input data sequence; a switch matrix for taking the data held in the first parallel shift register as input data, and for outputting the input data in distributing fashion in accordance with a rule selected by a control signal from a plurality of predetermined rules; and a second parallel shift register for taking the data output from the switch matrix as input data, and for outputting the input data as a data sequence having the prescribed data width.

8 Claims, 20 Drawing Sheets

RESULT OF CORRECTION (ENTIRE REGION)

RESULT OF EVALUATION/ CORRECTION AT ATTENTION DOT POSITION

DOT ARRANGEMENT IN EVALUATION WINDOW

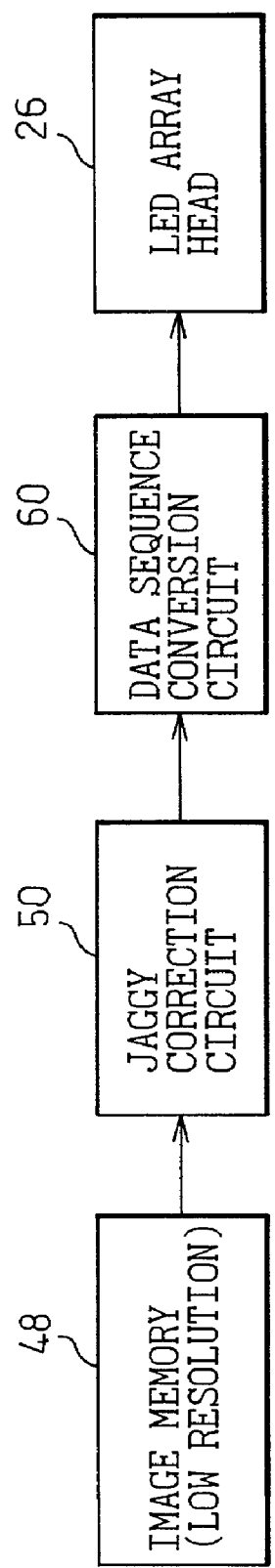

Fig. 13

| OUTPUT TERMINAL (DESTINATION) | FFo1 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi2-Q2 | FFi2-Q1 | FFi2-Q0 | FFi1-Q4 | FFi1-Q3 | FFi1-Q2 | FFi1-Q1 | FFi1-Q0 |

| OUTPUT TERMINAL (DESTINATION) | FFo2 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi4-Q0 | FFi3-Q4 | FFi3-Q3 | FFi3-Q2 | FFi3-Q1 | FFi3-Q0 | FFi2-Q4 | FFi2-Q3 |

| OUTPUT TERMINAL (DESTINATION) | FFo3 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi5-Q3 | FFi5-Q2 | FFi5-Q1 | FFi5-Q0 | FFi4-Q4 | FFi4-Q3 | FFi4-Q2 | FFi4-Q1 |

| OUTPUT TERMINAL (DESTINATION) | FFo4 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi7-Q1 | FFi7-Q0 | FFi6-Q4 | FFi6-Q3 | FFi6-Q2 | FFi6-Q1 | FFi6-Q0 | FFi5-Q4 |

| OUTPUT TERMINAL (DESTINATION) | FFo5 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi8-Q4 | FFi8-Q3 | FFi8-Q2 | FFi8-Q1 | FFi8-Q0 | FFi7-Q4 | FFi7-Q3 | FFi7-Q2 |

Fig.14

| OUTPUT TERMINAL (DESTINATION) | FFo1 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | × | × | × | × | × | × | × | × |

| OUTPUT TERMINAL (DESTINATION) | FFo2 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | × | × | × | × | × | × | × | × |

| OUTPUT TERMINAL (DESTINATION) | FFo3 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | × | × | × | × | × | × | × | × |

| OUTPUT TERMINAL (DESTINATION) | FFo4 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | × | × | × | × | × | × | × | × |

| OUTPUT TERMINAL (DESTINATION) | FFo5 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi2 -Q3 | FFi2 -Q2 | FFi2 -Q1 | FFi2 -Q0 | FFi1 -Q3 | FFi1 -Q2 | FFi1 -Q1 | FFi1 -Q0 |

Fig.15

| OUTPUT TERMINAL (DESTINATION) | FFo1 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | × | × | × | × | × | × | × | × |

| OUTPUT TERMINAL (DESTINATION) | FFo2 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | × | × | × | × | × | × | × | × |

| OUTPUT TERMINAL (DESTINATION) | FFo3 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi3-Q1 | FFi3-Q0 | FFi2-Q2 | FFi2-Q1 | FFi2-Q0 | FFi1-Q2 | FFi1-Q1 | FFi1-Q0 |

| OUTPUT TERMINAL (DESTINATION) | FFo4 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi6-Q0 | FFi5-Q2 | FFi5-Q1 | FFi5-Q0 | FFi4-Q2 | FFi4-Q1 | FFi4-Q0 | FFi3-Q2 |

| OUTPUT TERMINAL (DESTINATION) | FFo5 | | | | | | | |
|---|---|---|---|---|---|---|---|---|
| | -Da7 | -Da6 | -Da5 | -Da4 | -Da3 | -Da2 | -Da1 | -Da0 |
| OUTPUT SIGNAL | FFi8-Q2 | FFi8-Q1 | FFi8-Q0 | FFi7-Q2 | FFi7-Q1 | FFi7-Q0 | FFi6-Q2 | FFi6-Q1 |

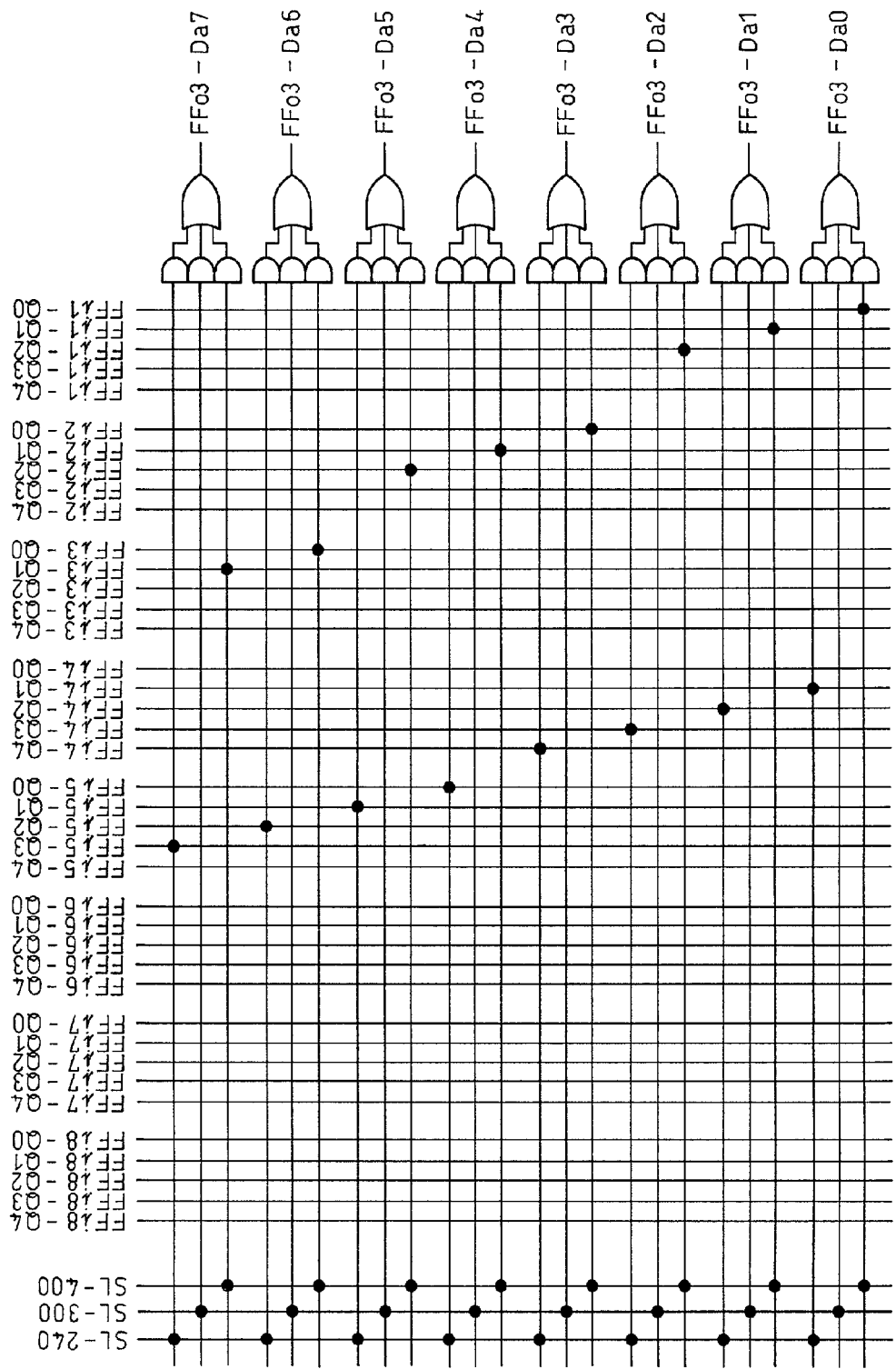

DATA SEQUENCE CONVERSION CIRCUIT AND PRINTER USING THE SAME

BACKGROUND OF THE INVENTION

1. Field of the Invention

The present invention relates to a data sequence conversion circuit for converting a plurality of input data sequences having different data widths into output data sequences having a prescribed data width, and also relates to a printer using the same.

2. Description of the Related Art

An LED printer is a form of electrophotographic image forming apparatus, and uses an LED array head as a means for exposing optical image information onto a photosensitive drum. Such an LED array head comprises: an LED array consisting of a row of LEDs arranged at prescribed pitch; a shift register consisting of storage elements each for storing one image data unit corresponding to one LED, the number of storage elements being the same as the number of LEDs; and an LED driving circuit for driving the LEDs to emit light in accordance with the image data stored in the shift register.

With increasing LED printer speed, and with increasing resolution and printing width, the amount of image data, that is transferred into the register section of the LED array head within a unit time, has increased. To increase the speed of image data transfer to the register section without increasing the transfer clock frequency of the shift register, the LED array head employs a parallel shift register configuration in which a sequence of image data corresponding to the plurality of LEDs is input simultaneously in parallel form.

The printing resolution of an LED printer is determined by the pitch of the LED arrangement. Japanese Unexamined Patent Publication No. 7-156442 discloses an LED printer that uses an LED array consisting of LEDs arranged at a pitch corresponding to the pixel pitch of resolution equal to the least common multiple of a plurality of different resolutions. For example, image data of resolutions 240 dpi, 300 dpi, and 400 dpi are printed using an LED array head having a resolution of 1200 dpi which is the least common multiple of the image data resolutions.

The above Unexamined Patent Publication number also discloses an LED printer in which, using the fact that one pixel unit of low resolution print data is formed by a plurality of LEDS, control is performed to add smaller print dots around an attention pixel or erase smaller print dots from an attention pixel by individually and selectively lighting or extinguishing the LEDs forming the pixel unit. That is, the LED printer disclosed therein has the function of correcting for jagged edges (jaggies) that appear when printing a low resolution image.

In an LED printer that prints low resolution print data of 240 dpi, 300 dpi, and 400 dpi using an LED array head having a resolution of 1200 dpi which is the least common multiple of the print data resolutions, one dot of print image data of 240 dpi is formed from five print dots of 1200 dpi, one dot of print image data of 300 dpi is formed from four print dots of 1200 dpi, and one dot of print image data of 400 dpi is formed from three print dots of 1200 dpi. When the jaggy correction method described above is applied to this LED printer, a jaggy correction circuit determines a pattern of five, four, or three high resolution print dots, respectively, and outputs the pattern at the attention dot position of the low resolution print data of 240 dpi, 300 dpi, or 400 dpi, respectively. That is, one unit of data output from the jaggy correction circuit varies depending on the resolution of the input low resolution print image data.

If an LED array head employing a parallel shift register configuration is used as the LED array head of 1200 dpi, the data width of the parallel input to the LED array head does not necessarily coincide with the width of the print dot pattern that the jaggy correction circuit outputs. Data sequence conversion is therefore needed for converting the output data sequence of the jaggy correction circuit, which varies depending on the input image data resolution, into a data sequence that matches the data width of the parallel input to the LED array head.

A data sequence conversion circuit may be constructed using a PS conversion circuit, which applies a parallel-to-serial conversion to the output data of the jaggy correction circuit, and an SP conversion circuit, which applies a serial-to-parallel conversion to the PS converted output so as to match the parallel input data width of the LED array head, and the data sequence conversion may be accomplished by applying a suitable control signal (clock signal).

However, in the data sequence conversion circuit of the above configuration, since the print dot data is first converted into serial data, this is equivalent to serially transferring the high resolution print dot data. Accordingly, the data conversion circuit must be constructed using high speed operating shift registers, defeating the purpose of the LED array head of the parallel shift register configuration in which the print dot data are input in parallel in order to increase the print speed without increasing the frequency of the shift register transfer clock.

SUMMARY OF THE INVENTION

The present invention has been devised in view of the above problem, and an object of the invention is to provide a data sequence conversion circuit for converting a plurality of input data sequences having different data widths into output data sequences having a prescribed data width without converting them into serial data. It is another object of the present invention to provide an LED printer that uses such a data sequence conversion circuit.

To achieve the above objects, according to the present invention, there is provided a data sequence conversion circuit which takes as an input any one of a plurality of input data sequences having different data widths, and which converts the input data sequence into an output data sequence having a prescribed data width for output, the circuit comprising: a first parallel shift register for holding the input data sequence; a switch matrix for taking the data held in the first parallel shift register as input data, and for outputting the input data in distributing fashion in accordance with a rule selected by a control signal from a plurality of predetermined rules; and a second parallel shift register for taking the data output from the switch matrix as input data, and for outputting the input data as a data sequence having the prescribed data width.

In the above configured data sequence conversion circuit, any one of the plurality of input data sequences having different data widths is held in the first parallel shift register. Then, the data held in the first parallel shift register is read as input data into the switch matrix, and is output from the switch matrix in distributing fashion in accordance with a rule selected by a control signal from a plurality of predetermined rules. The thus output data is input into the second parallel shift register which outputs a data sequence having the prescribed data width. In this way, the desired data sequence conversion can be accomplished without converting the input data sequence into serial data.

Preferably, according to the present invention, when the data widths of the plurality of input data sequences are denoted by $W_n$ (n=1, 2, 3, . . . ), respectively, and the data width of the output data sequence by $W_o$, the first parallel shift register has a data width at least equal to the largest value of $W_n$ (n=1, 2, 3, . . . ), and has the number of stages at least equal to the largest value of the quotients $QI_n$ (n=1, 2, 3, . . . ) each obtained by dividing the least common multiple of $W_n$ (n=1, 2, 3, . . . ) and $W_o$ by $W_n$.

Preferably, according to the present invention, when the data widths of the plurality of input data sequences are denoted by $W_n$ (n=1, 2, 3, . . . ), respectively, and the data width of the output data sequence by $W_o$, the second parallel shift register has the number of stages at least equal to the largest value of the quotients $QO_n$ (n=1, 2, 3, . . . ) each obtained by dividing the least common multiple of $W_n$ (n=1, 2, 3, . . . ) and $W_o$ by $W_o$.

Preferably, according to the present invention, when the data width of the input data sequence is denoted by $W_n$, and the data width of the output data sequence by $W_o$, the switch matrix outputs the input data so that $W_n \times QI_n$ units of data input and held in the first stage to the $(QI_n)$th stage in the first parallel shift register as counted from the input side thereof are input to the first stage to the $(QO_n)$th stage in the second parallel shift register as counted from the output side thereof, where $QI_n$ is the quotient of the least common multiple of $W_n$ and $W_o$ divided by $W_n$, and $QO_n$ is the quotient of the least common multiple of $W_n$ and $W_o$ divided by $W_o$.

Furthermore, according to the present invention, there is provided a printer having the above-described data sequence conversion circuit which is located between a jaggy correction circuit and a line-like printhead. In this printer, high resolution image data can be transferred into the shift register section of the line-like printhead without increasing the frequency of the shift register transfer clock.

BRIEF DESCRIPTION OF THE DRAWINGS

Further features and advantages of the present invention will be apparent from the following description with reference to the accompanying drawings, in which:

FIG. 7 is a block diagram for explaining the data sequence conversion circuit of the present invention in relation to other circuits;

FIG. 13 is a diagram showing the distributing output rule used in a switch matrix when performing the data sequence conversion from 5-bit width to 8-bit width;

FIG. 14 is a diagram showing the distributing output rule used in the switch matrix when performing the data sequence conversion from 4-bit width to 8-bit width;

FIG. 15 is a diagram showing the distributing output rule used in the switch matrix when performing the data sequence conversion from 3-bit width to 8-bit width;

FIGS. 16A, 16B, 16C, 16D, and 16E are diagrams showing an example of the circuit configuration of the switch matrix.

DESCRIPTION OF THE PREFERRED EMBODIMENTS

An embodiment of the present invention will be described below with reference to the accompanying drawings.

Figure 1:
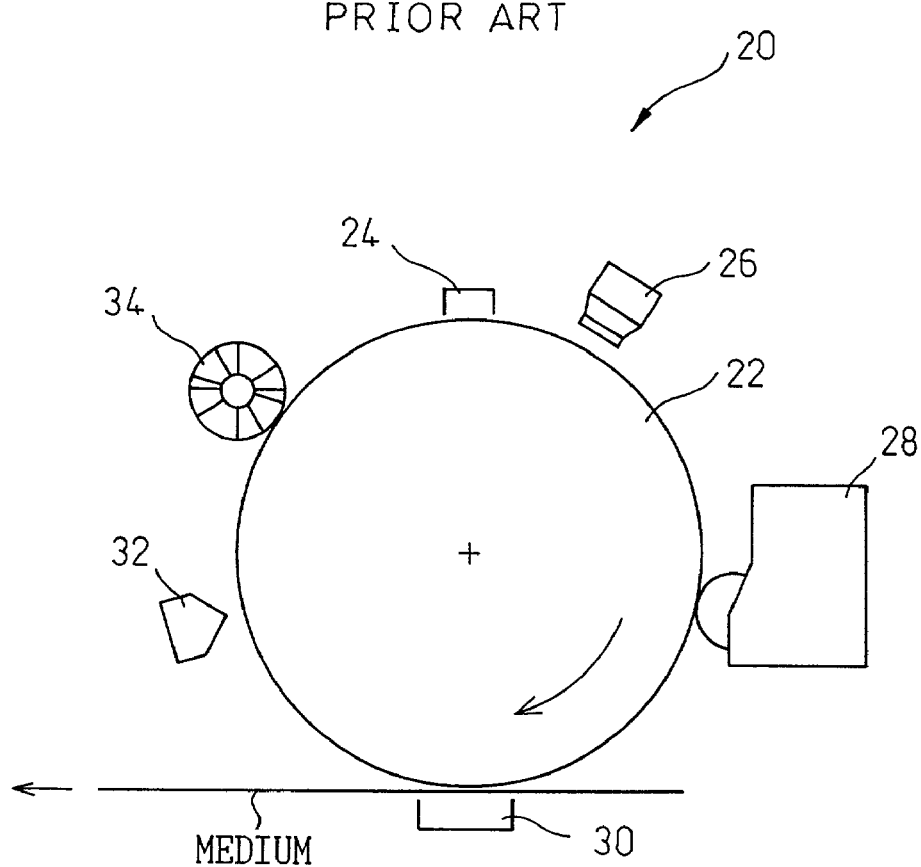
FIG. 1 is a diagram schematically showing the construction of a printing section in an LED printer to which the data sequence conversion circuit of the present invention can be applied.

FIG. 1 is a diagram schematically showing the construction of a printing section in an LED printer to which the data sequence conversion circuit of the present invention can be applied. The printing section 20 comprises: a photosensitive drum 22 as an image carrier located at the center; a charging unit 24 for applying electrical charges to the surface of the photosensitive drum; an LED array head 26 as an exposure unit for forming a latent image; a developing unit 28 for forming a toner image by making the latent image visible using a developer; a transfer unit 30 for transferring the developed toner image onto an image recording medium; a charge erasing unit 32 for erasing charges remaining on the surface of the photosensitive drum; and a cleaner 34 for removing toner remaining on the photosensitive drum after the transfer of the toner image.

Figure 2:
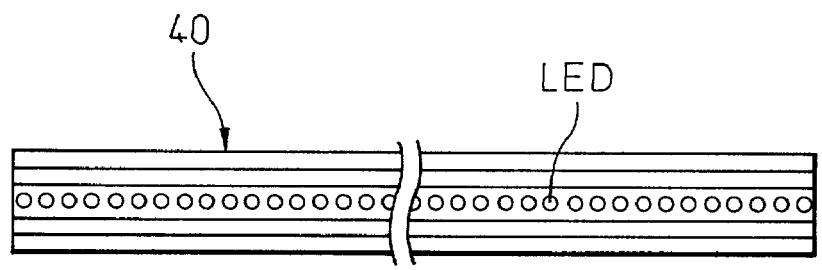
FIG. 2 is a diagram showing an LED array as viewed from the photosensitive drum side.
Figure 3:
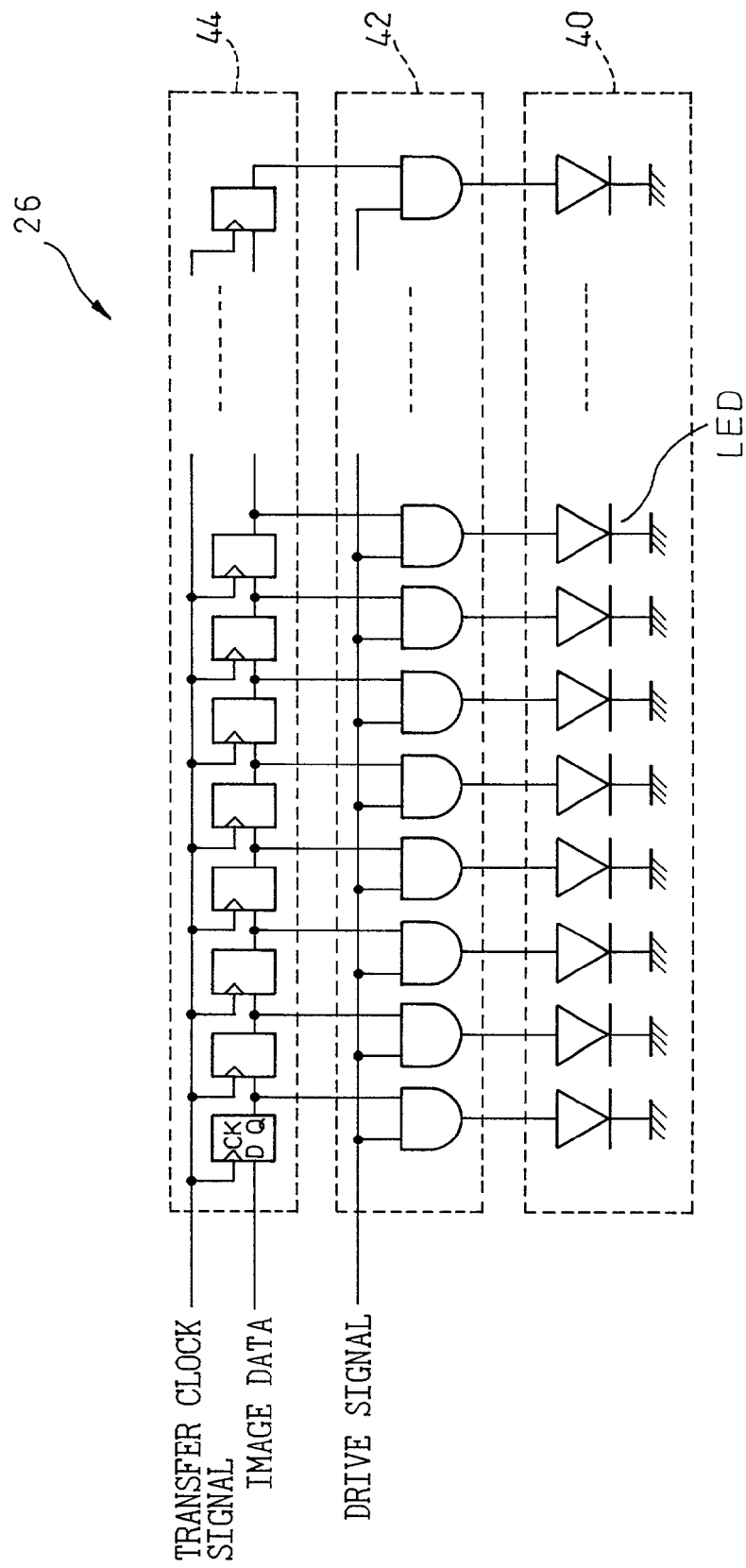
FIG. 3 is a diagram showing the configuration of a serial data input type LED array head.

FIG. 2 is a diagram of an LED array as viewed from the photosensitive drum 22 side, and FIG. 3 is a diagram showing the configuration of a serial data input type LED array head. As shown in these figures, the LED array head 26 in FIG. 1 comprises: an LED array 40 consisting of a row of LEDs arranged at a prescribed pitch; a shift register 44 consisting of storage elements (flip-flops) each for storing one image data unit corresponding to one LED, the number of storage elements being the same as the number of LEDS; and an LED driving circuit 42 for driving the LEDs to emit light in accordance with the image data stored in the shift register. The flip-flop located at the innermost end of the shift register 44 corresponds to the leftmost LED in FIG. 2. That is, the positional relationship of the LEDs is reversed left and right between FIG. 2 and FIG. 3.

Figure 4:
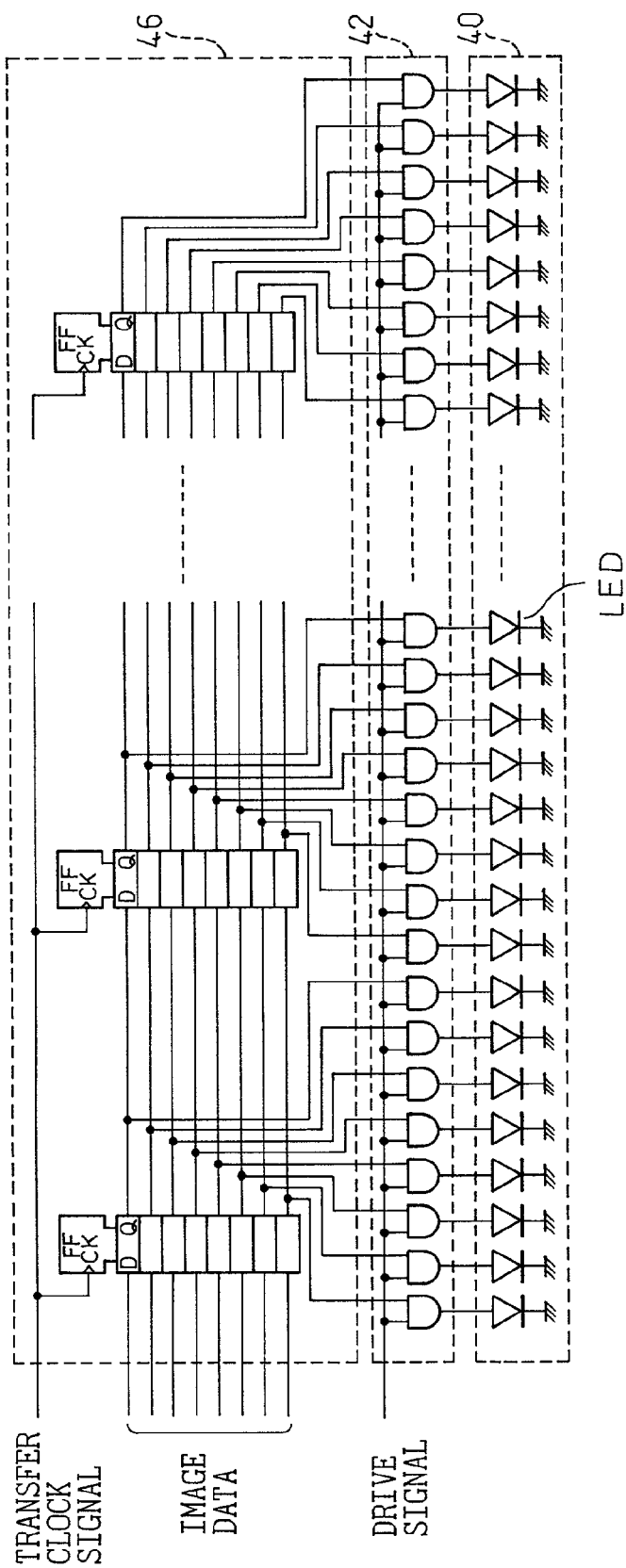
FIG. 4 is a diagram showing the configuration of a parallel data input type LED array head.

FIG. 4 is a diagram showing the configuration of a parallel data input type LED array head. As previously noted, with increasing LED printer speed, and with increasing resolution and printing width, the amount of image data that is transferred into the shift register of the LED array head within a unit time increases. To increase the speed of image data transfer to the shift register without increasing the transfer clock frequency of the shift register, the LED array head employs a parallel shift register configuration in which a sequence of image data corresponding to the plurality of LEDs is input simultaneously in parallel form. In the example of FIG. 4, an 8-bit parallel shift register 46 is used. The high-order bit of the 8-bit parallel data corresponds to the leading bit of serial data (the innermost bit in the case of a serial shift register, or the leftmost LED in the LED array of FIG. 2).

Figure 5:
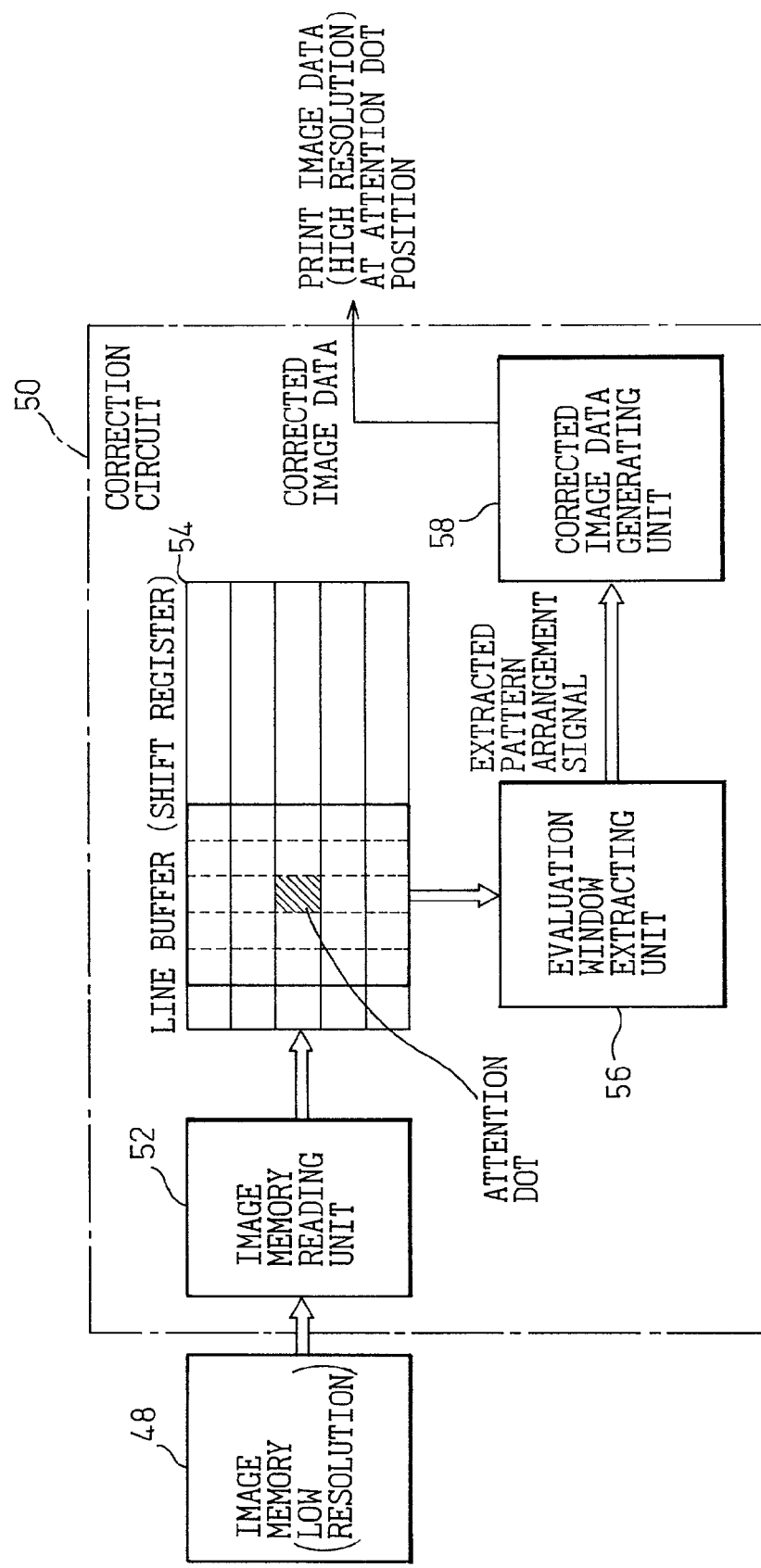
FIG. 5 is a diagram showing the configuration of a jaggy correction circuit.

FIG. 5 is a diagram showing the configuration of a jaggy correction circuit. As previously stated, the printing resolution of an LED printer is determined by the pitch of the LED arrangement. However, in the case of an LED printer that uses an LED array consisting of LEDs arranged at a pitch corresponding to the pixel pitch of resolution equal to the least common multiple of a plurality of different resolutions (for example, a printer that prints image data of 240 dpi, 300 dpi, and 400 dpi by using an LED array head of 1200 dpi which is the least common multiple of the image data resolutions), use is made of the fact that one pixel unit of low resolution print data is formed by a plurality of LEDs, and control is performed to add smaller print dots around an attention pixel or erase smaller print dots from the attention pixel by individually and selectively lighting or extinguishing the LEDs forming the pixel unit, thereby eliminating jagged edges or jaggies that appear when printing a low resolution image.

In the jaggy correction circuit 50 illustrated in FIG. 5, low resolution print data expanded in an image memory 48 is read into a line buffer 54 by an image memory reading unit 52. An evaluation window extracting unit 56 extracts an attention dot and its neighboring rectangular regions as an evaluation window from the line buffer 54. A corrected image data generating unit 58 determines, from the pattern extracted as the evaluation window, a high resolution print dot pattern with smaller print dots added or erased at the attention dot position, and outputs the thus determined pattern as corrected image data.

Figure 6C:
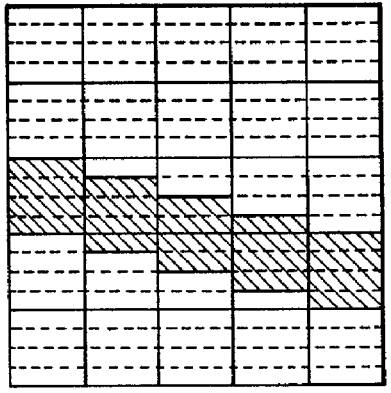
FIGS. 6A, 6B, and 6C are diagrams for explaining the operation of the jaggy correction circuit.
Figure 6B:
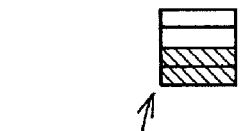
Figure 6A:
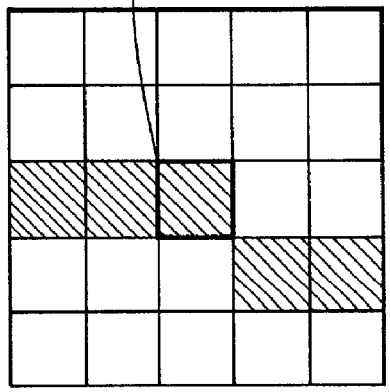

FIGS. 6A, 6B, and 6C are diagrams for explaining the operation of the jaggy correction circuit, illustrating an example of how the print dot pattern is determined in the jaggy correction circuit 50 of FIG. 5. From the pattern of FIG. 6A which is a portion extracted from the low resolution print data, the corrected high resolution print dot pattern at the attention dot position in the center of the extracted region is determined as shown in FIG. 6B. By repeating a similar correction process, the low resolution print pattern of the shape shown in FIG. 6A is corrected to the high resolution print dot pattern shown in FIG. 6C.

FIG. 7 is a block diagram for explaining the data sequence conversion circuit of the present invention in relation to other circuits. As previously described, in an LED printer that prints low resolution print data of 240 dpi, 300 dpi, and 400 dpi using an LED array head having a resolution of 1200 dpi which is the least common multiple of the print data resolutions, one dot of print image data of 240 dpi is formed from five print dots of 1200 dpi, one dot of print image data of 300 dpi is formed from four print dots of 1200 dpi, and one dot of print image data of 400 dpi is formed from three print dots of 1200 dpi.

The jaggy correction circuit 50 (FIG. 5), which is provided in such an LED printer, determines a pattern of five, four, or three high resolution print dots, respectively, and outputs the pattern at the attention dot position of the low resolution print data of 240 dpi, 300 dpi, or 400 dpi, respectively. That is, the output unit of the jaggy correction circuit 50 varies depending on the resolution of the input low resolution print image data.

If an LED array head employing a parallel shift register configuration is used as the LED array head of 1200 dpi, the data width (8 bits in the example of FIG. 4) of the parallel input to the LED array head 26 does not necessarily coincide with the width of the print dot pattern that the jaggy correction circuit 50 outputs. Therefore, the data sequence conversion circuit 60 for converting the output data sequence of the jaggy correction circuit 50, which varies depending on the input image data resolution, into a data sequence having a data width that matches the parallel input to the LED array head 26, must be provided between the jaggy correction circuit 50 and the LED array head 26, as shown in FIG. 7.

Figure 8:
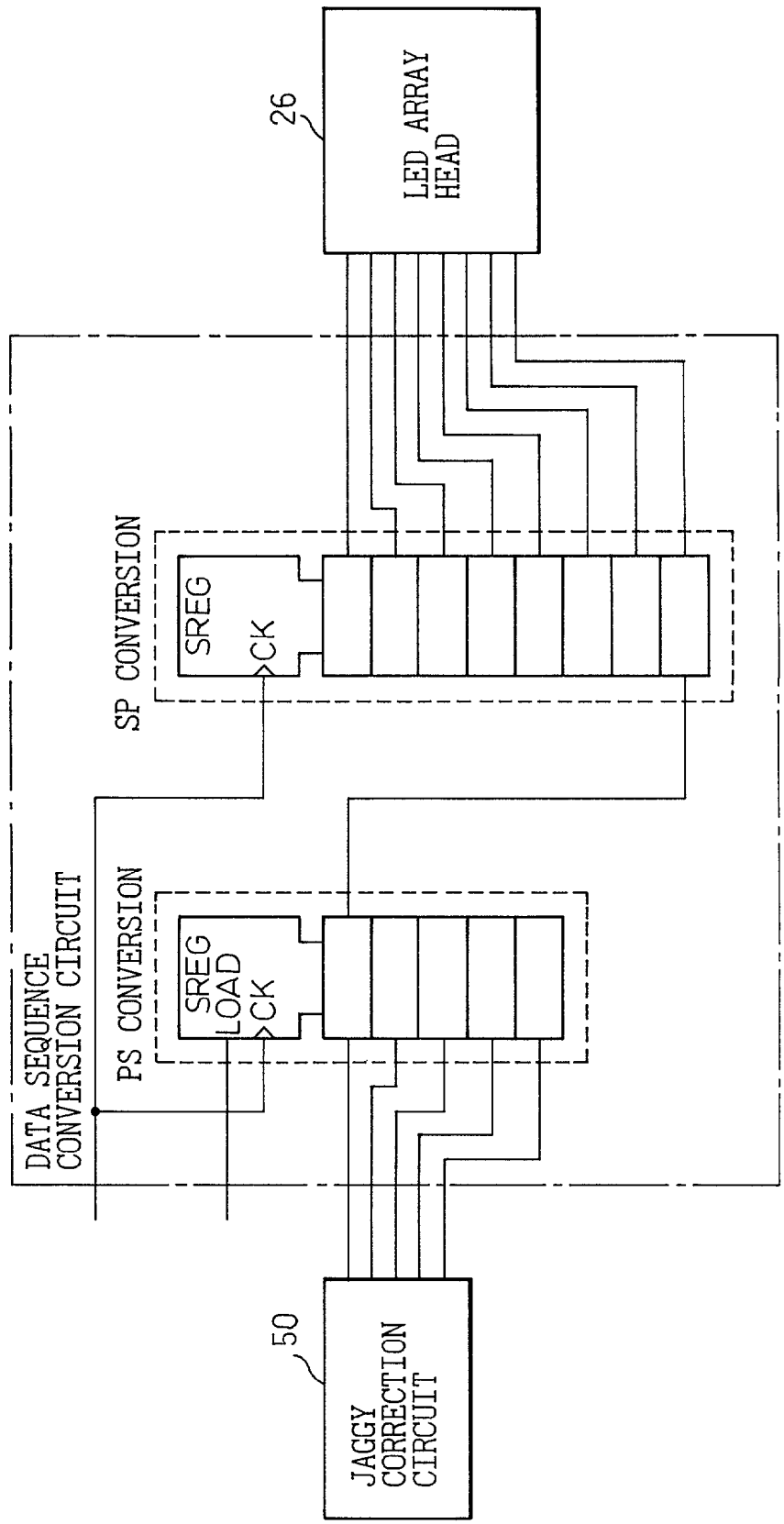
FIG. 8 is a diagram showing the configuration of a prior art data sequence conversion circuit.

FIG. 8 is a diagram showing the configuration of a prior art data sequence conversion circuit. This prior art circuit comprises a PS conversion circuit 62, which applies a parallel-to-serial conversion to the output data of the jaggy correction circuit 50, and an SP conversion circuit 64, which applies a serial-to-parallel conversion to the PS converted output so as to match the parallel input data width of the LED array head, and a suitable control signal (clock signal) is applied for the operation of the circuit. In the example of FIG. 8, a data sequence of 5-bit width is converted into a data sequence of 8-bit width.

However, in the data sequence conversion circuit of FIG. 8, since the print dot data is first converted into serial data, this is equivalent to serially transferring the high resolution print dot data. Accordingly, the data conversion circuit must be constructed using high speed operating shift registers, defeating the purpose of the LED array head of the parallel shift register configuration in which the print dot data are input in parallel in order to increase the print speed without increasing the frequency of the shift register transfer clock.

Consider, for example, the case where a continuous sheet printer of 10,000 lines (line height of about 0.42 cm or ⅙ inch) and print width of 43.18 cm (17 inches), equipped with an LED array head of 1200 dpi, prints low resolution print data of 240 dpi, 300 dpi, and 400 dpi by converting them to 1200 dpi. In the case of an LED array head that does not employ a parallel data input configuration, the data transfer frequency F of the LED array head is given as follows.

240 dpi: F>136.0 MHz
300 dpi: F>170.0 MHz
400 dpi: F>226.6 MHz

On the other hand, in the case of an LED array head of 8-bit parallel data input type, the data transfer frequency F can be reduced by a factor of 8, compared with the above frequency. However, in the case of the data sequence conversion circuit of FIG. 8, the same frequency as given above is required to operate the shift registers of the PS conversion circuit and SP conversion circuit.

Figure 9:
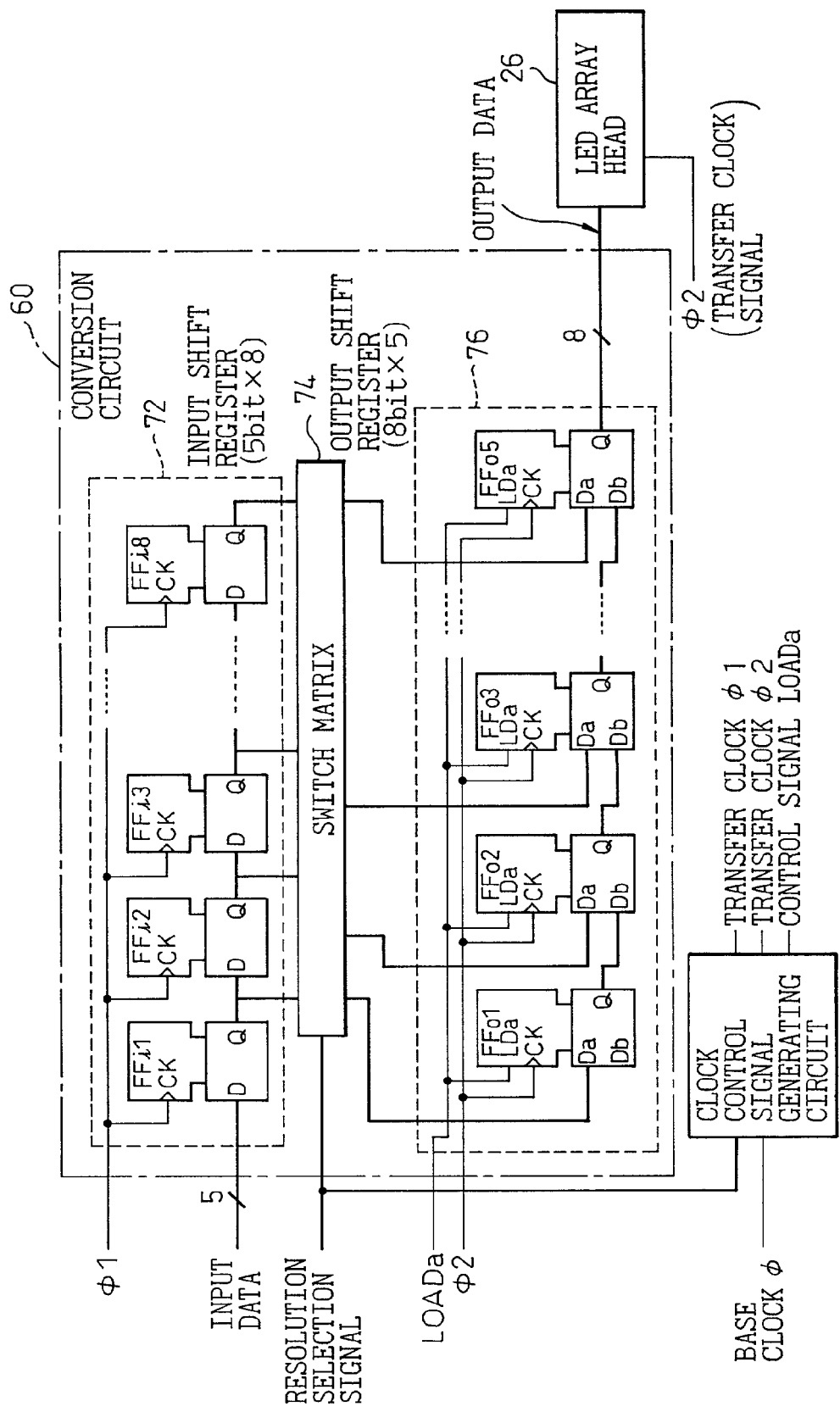
FIG. 9 is a diagram showing the configuration of one embodiment of a data sequence conversion circuit according to the present invention.

FIG. 9 is a diagram showing one embodiment of the data sequence conversion circuit of the present invention, which is devised to overcome the above problem. The data sequence conversion circuit 60 is applicable for use in an LED printer in which low resolution print data of 240 dpi, 300 dpi, and 400 dpi are corrected for jaggies and are printed using a 1200 dpi LED array head of 8-bit parallel input type.

The jaggy correction circuit for correcting jaggies in the low resolution print data of 240 dpi, 300 dpi, or 400 dpi determines and outputs a pattern of five, four, or three high resolution print dots, respectively, by correcting print dots at the attention dot position of the low resolution print data. At this time, the jaggy correction circuit shown in FIG. 5 outputs a 5-bit, 4-bit, or 3-bit data sequence as the print dot correction at the attention dot position of the low resolution print data progresses.

The jaggy correction circuit 50 is constructed as a circuit capable of outputting five bits, the largest bit count of the high resolution output dot patterns, and the corrected image data generating unit is configured to generate a pattern appropriate to the input resolution; in this way, the same jaggy correction circuit can be used for the various resolutions.

To convert input data sequences of 5-bit width into output data sequences of 8-bit width, the input data as parallel data should be converted in blocks of 40 bits which is the least common multiple of the input and output data widths, that is, input 5 bits×8 are together converted into 8 bits×5. Likewise, to convert input data sequences of 4-bit width into output data sequences of 8-bit width, 8 bits are treated as one unit, and input 4 bits×2 are together converted into 8 bits×1; similarly, to convert input data sequences of 3-bit width into output data sequences of 8-bit width, 24 bits are treated as one unit, and the input 3 bits×8 are together converted into 8 bits×3.

Accordingly, in the circuit shown in FIG. 9, an input shift register 72 needs to have a data width of 5 bits which is equal to the largest bit width of the input data sequence. Further, the input shift register 72 needs to have eight stages, the largest number of stages necessary for input. On the other hand, an output shift register 76 needs to have five stages, the largest number of stages necessary for output.

In FIG. 9, the input shift register 72 is constructed from eight stages of register FFS i1 to i8 each having a 5-bit width. The 40 bits of data held in the input shift register 72 are read into a switch matrix 74. The data read into the switch matrix 74 are output to the output shift register 76 in accordance with a rule described later. The output shift register 76 is constructed from five stages of register FFs o1 to o5 each having an 8-bit width which is equal to the parallel input data width of the LED array head 26.

Each of the register FFs o1 to o5 forming the output shift register 76 selects, based on a LOADa signal, whether to take and hold data input to its Da terminal from an output of the switch matrix 74 or data input to its Db terminal from a Q output at the preceding stage. In the present embodiment, when the LOADa signal is high, the data applied at the Da terminal is latched into the register FF by the input clock while, when the LOADa signal is low, the data applied at the Db terminal is latched into the register FF by the input clock.

When correcting the low resolution print data of 240 dpi for jaggies and printing the data with the LED array head of 1200 dpi, the jaggy correction circuit outputs a high resolution print dot pattern data sequence of 5-bit width. In the data sequence conversion circuit 60 shown in FIG. 9, when 5 bits×8 stages=40 bits of data are input and held in the input shift register 72, the input data, output from the switch matrix 74 for distribution in accordance with a suitable rule, are latched into the output shift register 76, and the data latched into the output shift register 76 are output in sequence for transfer to the LED array head 26. By repeating this process, input data sequences of 5-bit width can be converted into output data sequences of 8-bit width.

Figure 10:
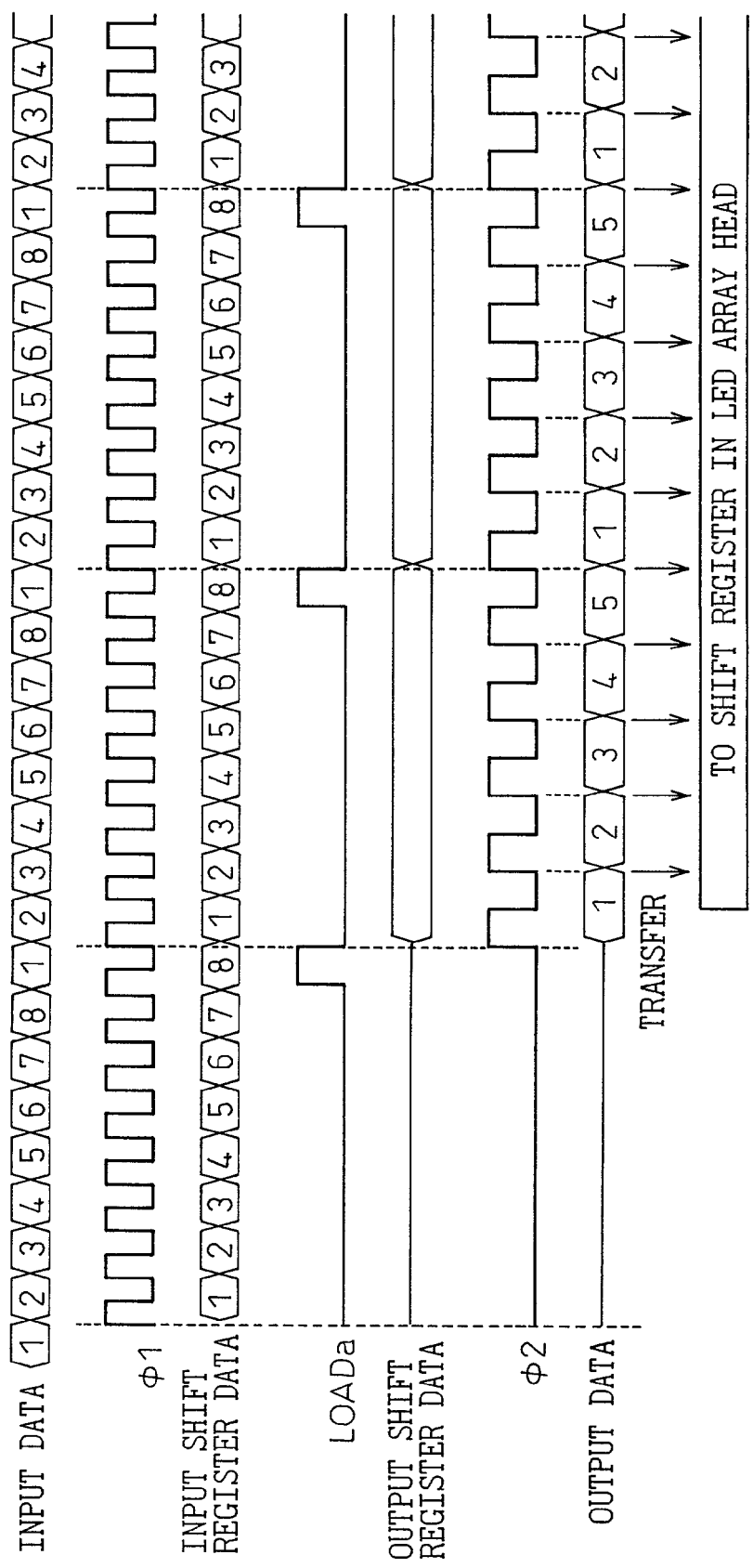
FIG. 10 is a timing chart for explaining a data sequence conversion operation from 5-bit width to 8-bit width.

This series of conversion operations is illustrated in timing chart form in FIG. 10. As can be seen from the figure, the data sequence conversion process can be performed in sequence by repeating shift operations using clocks such that data of five stages are output from the output shift register while data are being input into the eight stages of the input shift register. Accordingly, the ratio of the frequency of shift clock φ1 applied to the input shift register 72 to the frequency of shift clock φ2 applied to the output shift register 76 is 8:5.

On the other hand, when correcting the low resolution print data of 300 dpi for jaggies and printing the data with the LED array head of 1200 dpi, the jaggy correction circuit outputs a high resolution print dot pattern data sequence of 4-bit width. In the data sequence conversion circuit 60 shown in FIG. 9, when 4 bits×2 stages=8 bits of data are input and held in the input shift register 72, the input data, output from the switch matrix 74 for distribution in accordance with a suitable rule, are latched into the output shift register 76, and the data latched into the output shift register 76 are output in sequence for transfer to the LED array head 26. By repeating this process, input data sequences of 4-bit width can be converted into output data sequences of 8-bit width.

Figure 11:
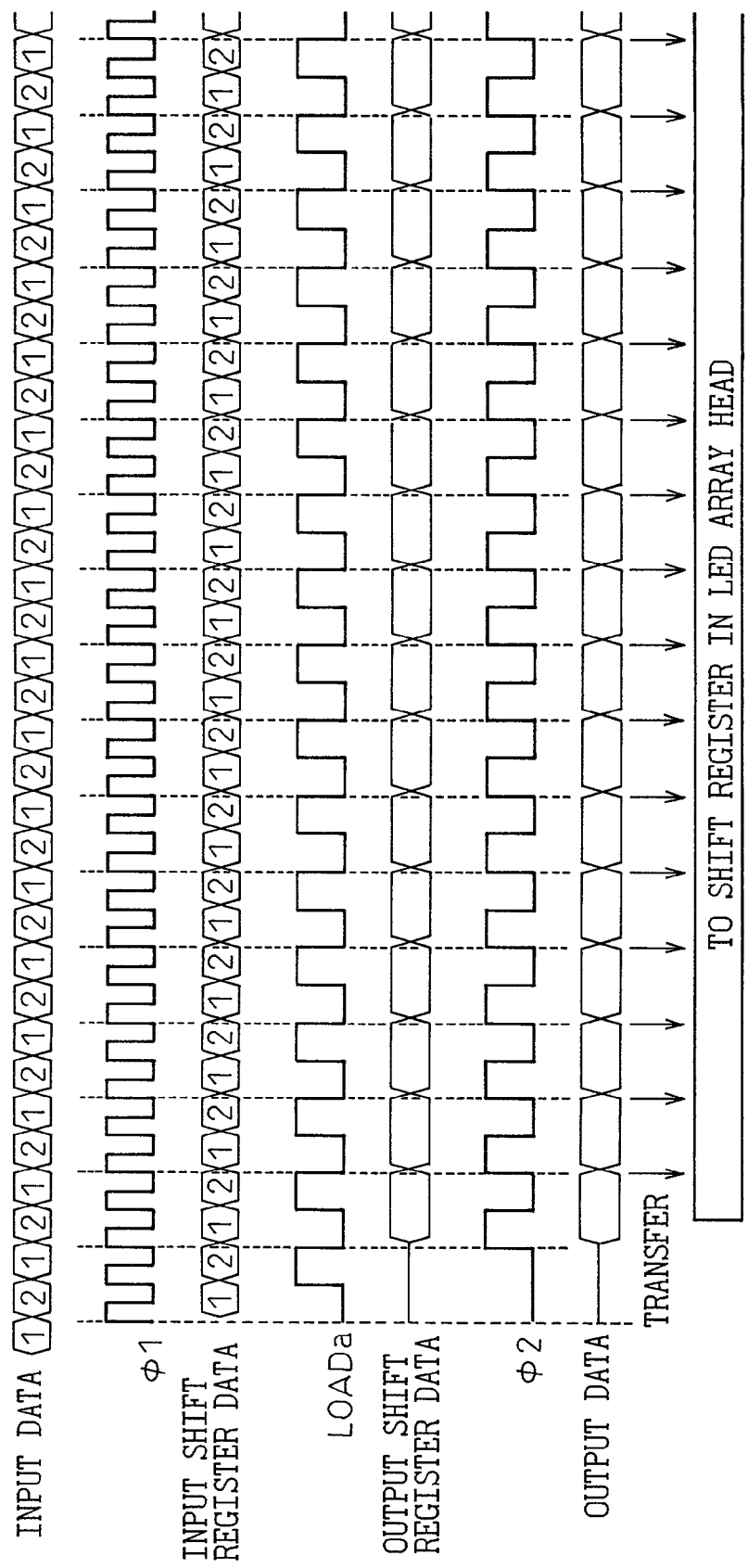
FIG. 11 is a timing chart for explaining a data sequence conversion operation from 4-bit width to 8-bit width.

This series of conversion operations is illustrated in timing chart form in FIG. 11. As can be seen from the figure, the data sequence conversion process can be performed in sequence by repeating shift operations using clocks such that data is output from one stage of the output shift register while data are being input into the two stages of the input shift register. Accordingly, the ratio of the frequency of shift clock φ1 applied to the input shift register to the frequency of shift clock φ2 applied to the output shift register is 2:1.

Further, when correcting the low resolution print data of 400 dpi for jaggies and printing the data with the LED array head of 1200 dpi, the jaggy correction circuit outputs a high resolution print dot pattern data sequence of 3-bit width. In the data sequence conversion circuit 60 shown in FIG. 9, when 3 bits×8 stages=24 bits of data are input and held in the input shift register 72, the input data, output from the switch matrix 74 for distribution in accordance with a suitable rule, are latched into the output shift register 76, and the data latched into the output shift register 76 are output in sequence for transfer to the LED array head 26. By repeating this process, input data sequences of 3-bit width can be converted into output data sequences of 8-bit width.

Figure 12:
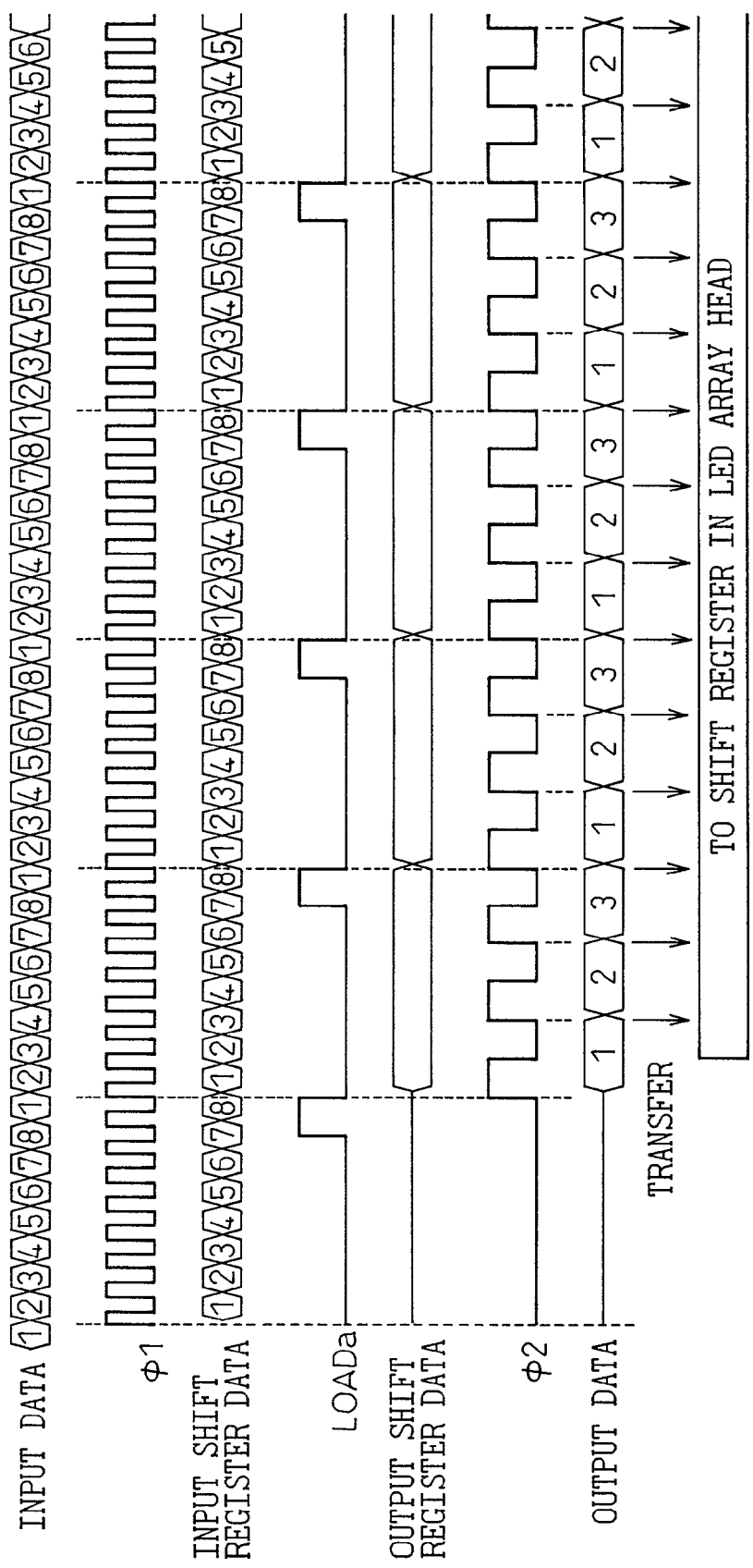
FIG. 12 is a timing chart for explaining a data sequence conversion operation from 3-bit width to 8-bit width.
Figure 16A:
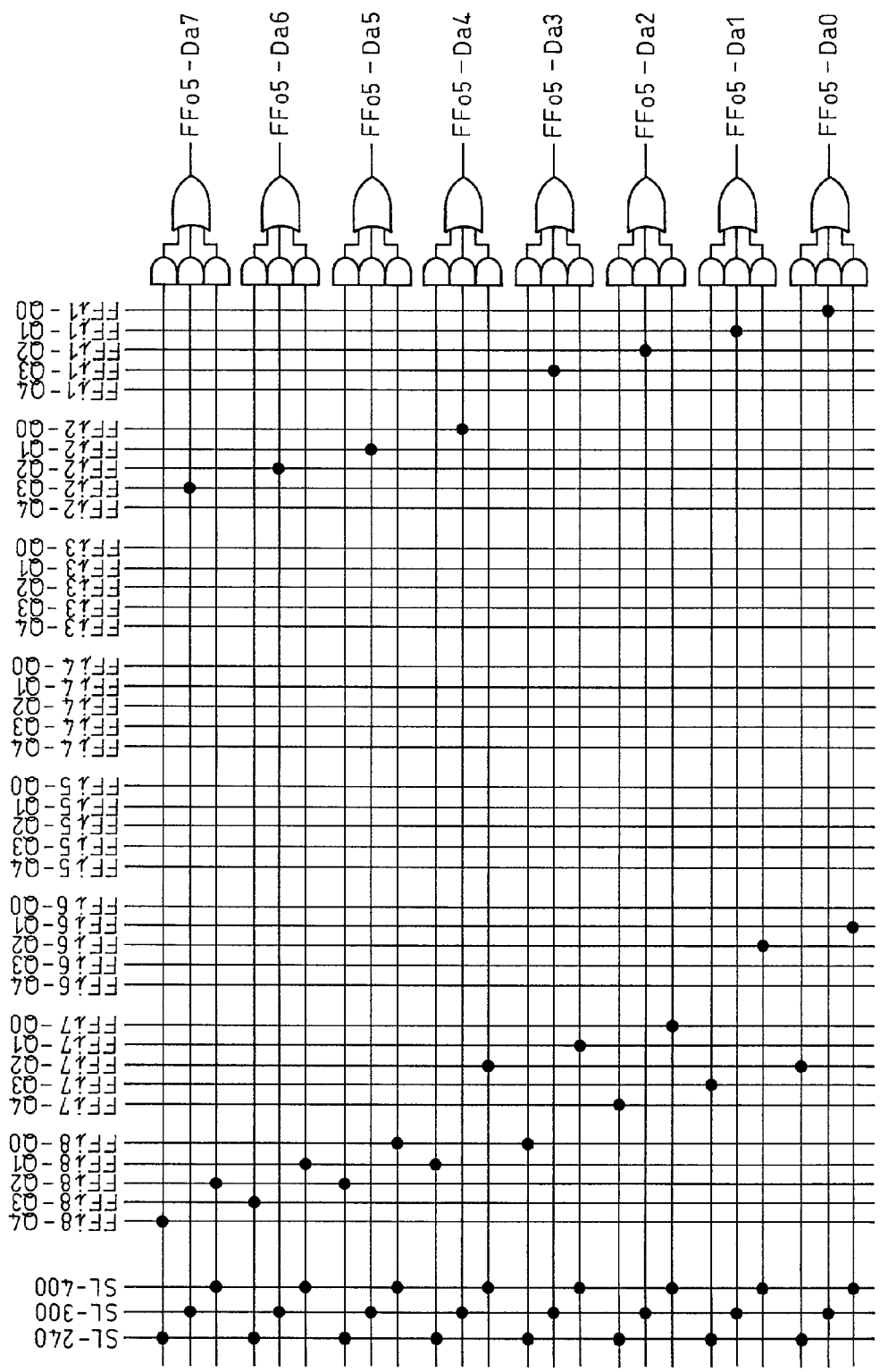
Figure 16B:
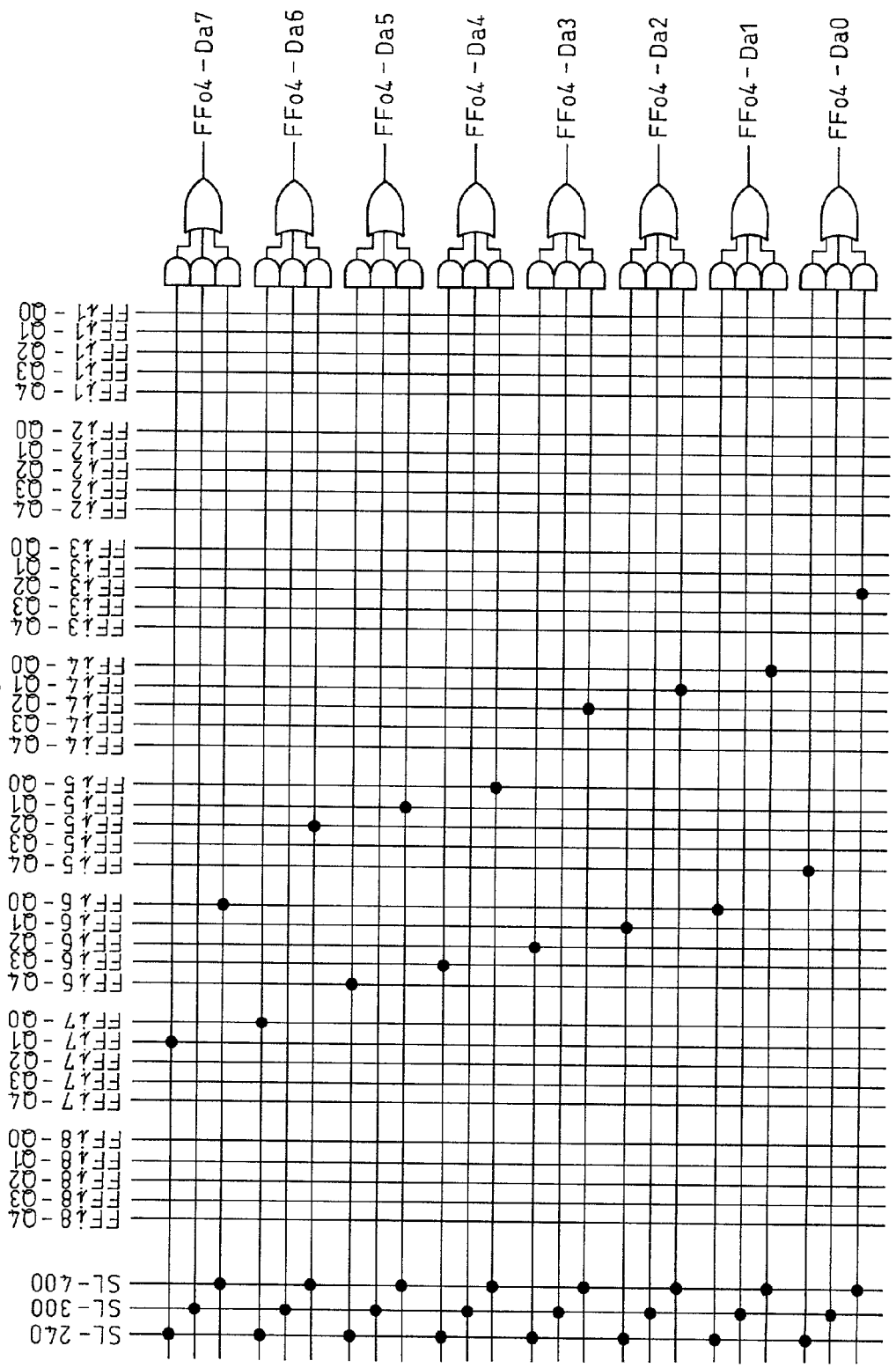
Figure 16D:
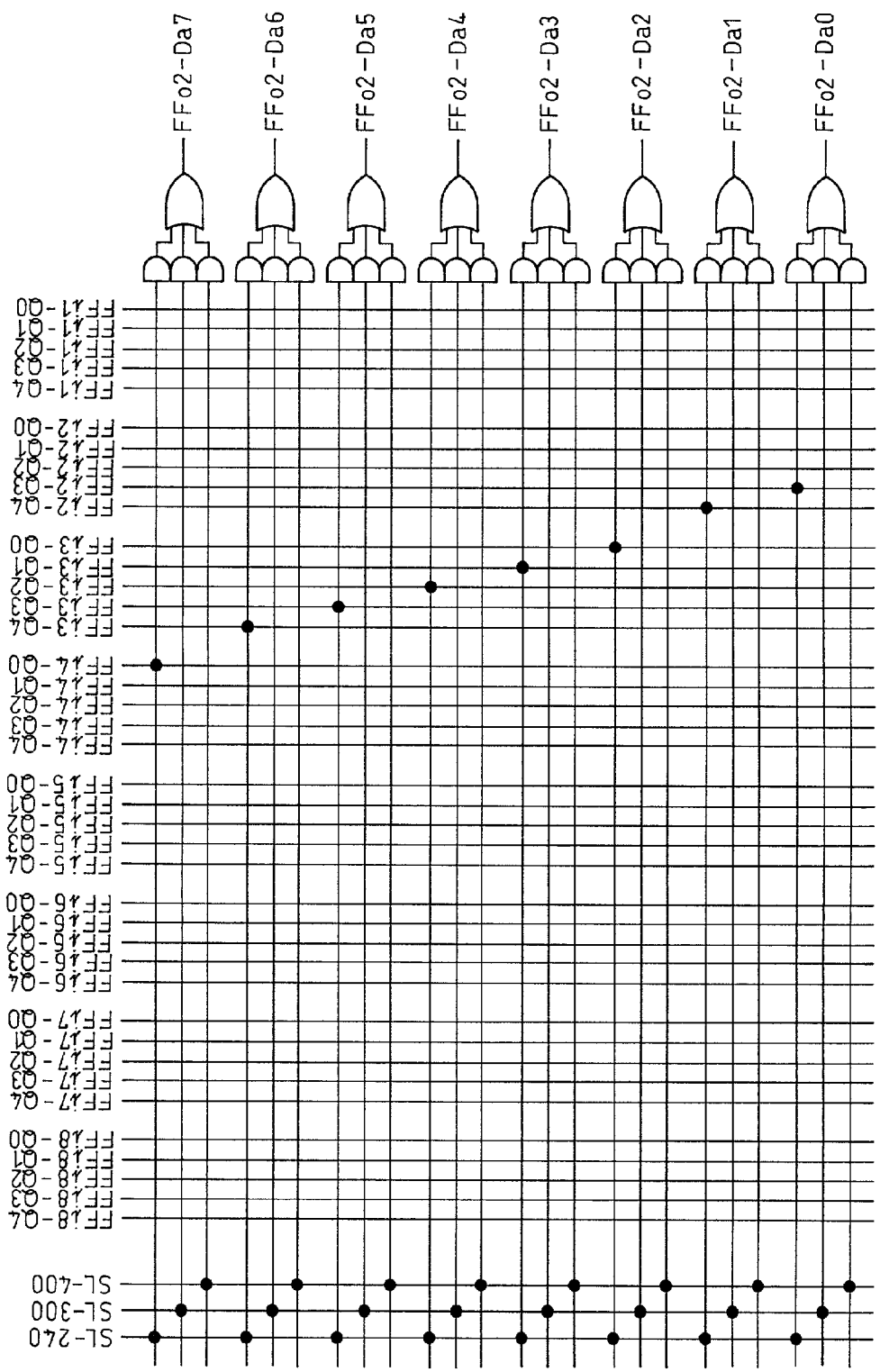
Figure 16E:
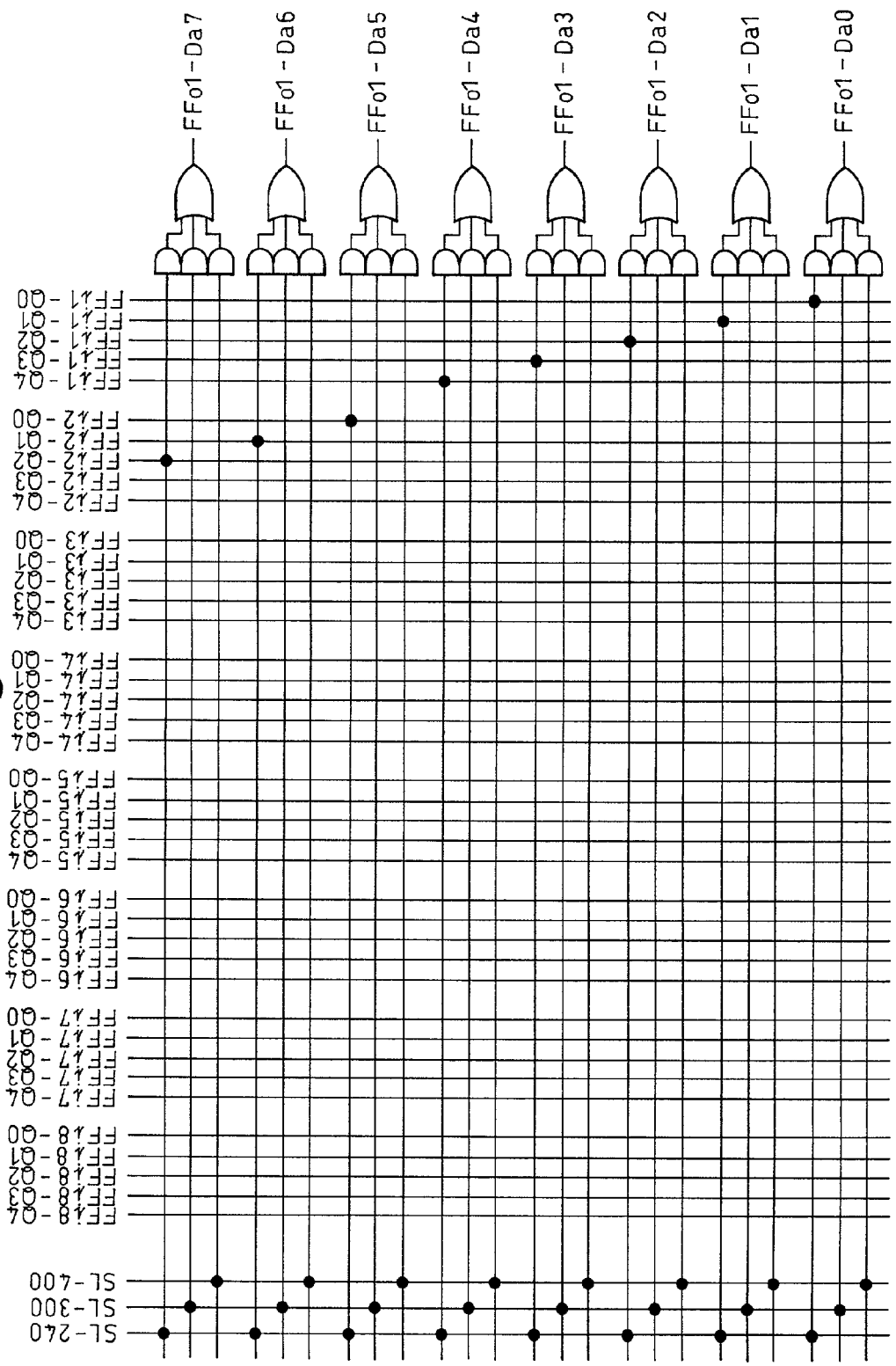

This series of conversion operations is illustrated in timing chart form in FIG. 12. As can be seen from the figure, the data sequence conversion process can be performed in sequence by repeating shift operations using clocks such that data of three stages are output from the output shift register while data are being input into the eight stages of the input shift register. Accordingly, the ratio of the frequency of shift clock φ1 applied to the input shift register to the frequency of shift clock φ2 applied to the output shift register is 8:3.

The data distribution rule employed in the switch matrix 74 will be explained with reference to the example of FIG. 9. In the following description, the bits of the 5-bit print dot data loaded into the input shift register 72 are designated by D4 to D0, where D0 is the dot printed at the right-hand side (which, in FIG. 2, corresponds to the LED at the right-hand side and, in FIG. 3 or 4, corresponds to the LED at the left-hand side). It is also assumed that D4 to D0, D3 to D0, and D2 to D0 are input as effective print dot data for jaggy correction at 240 dpi, 300 dpi, and 400 dpi, respectively. The bits of the data (Q outputs) held in the respective FFs iN (N=1, 2, . . . , 8) are designated by FF iN-Q4 to FF iN-Q0, respectively. Further, the bits at the switch matrix output terminals connected to the Da input terminals of the respective FFs oN (N=1, 2, . . . , 5) are designated by FF oN-Da7 to FF oN-Da0 in a relationship corresponding to the respective bits of the output shift register, where Da0 represents the dot printed at the right-hand side.

FIG. 13 shows the distributing output rule used in the switch matrix 74 when correcting the low resolution print data of 240 dpi for jaggies and printing the data with the LED array head of 1200 dpi. The figure shows the relationship between the switch matrix output data coupled to the respective Da input terminals of the output shift register and the Q outputs of the input shift register coupled into the switch matrix. For example, FF i8-Q4 (the leading bit of the input 40 bits) output from the input shift register 72 is applied at FF o5-Da7 of the output shift register 76 via the switch matrix 74.

Likewise, FIGS. 14 and 15 show the distributing output rules used in the switch matrix when correcting the low resolution print data of 300 dpi and 400 dpi for jaggies and printing the respective data with the LED array head of 1200 dpi. In each figure, the mark "x" means that the output data is not specifically specified (that is, not needed in the data sequence conversion of the present embodiment). As can be seen from these figures, the necessary number of stages, counting from the input side, are used in the input shift register, while in the output shift register, the necessary number of stages, counting from the output side, are used.

Figure 17A:
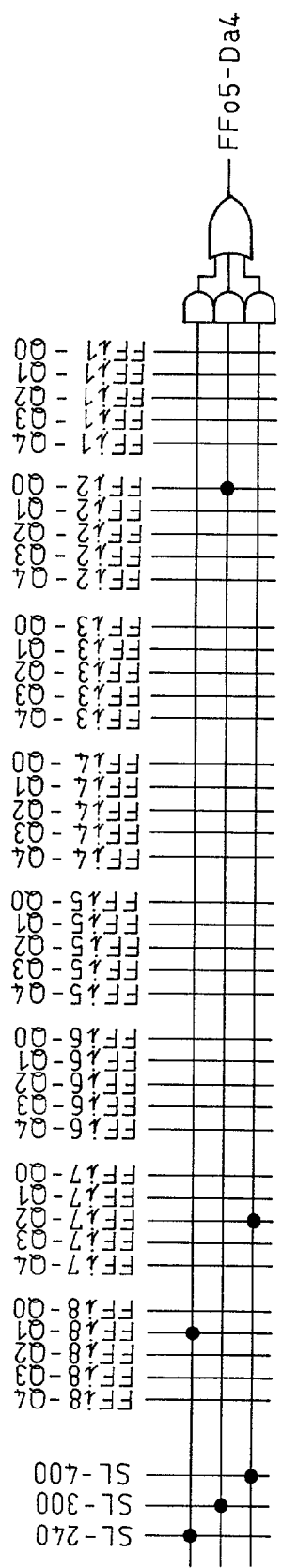
FIGS. 17A and 17B are diagrams for explaining the simplified designations in the switch matrix circuit.
Figure 17B:
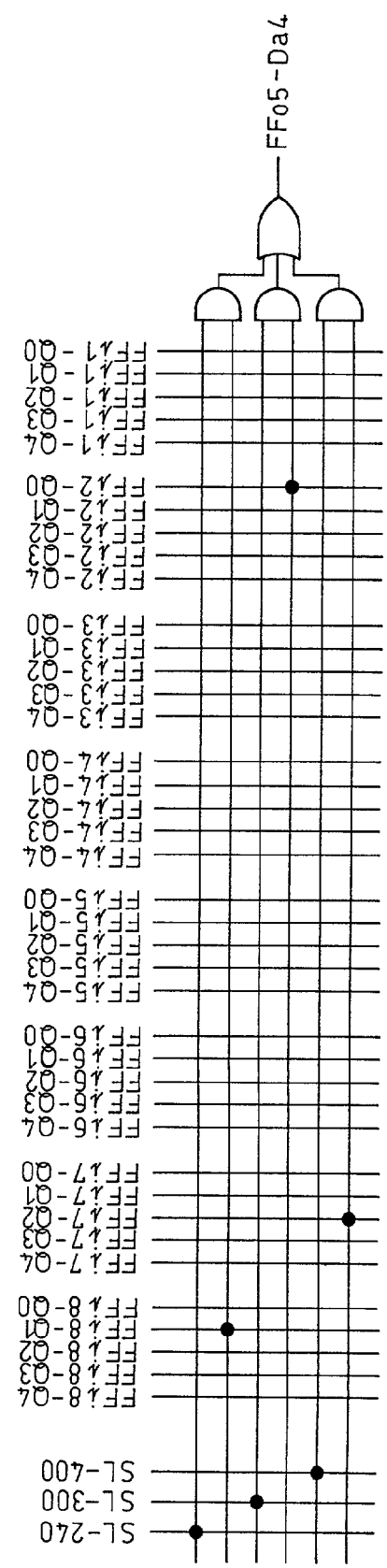

FIGS. 16A, 16B, 16C, 16D, and 16E are diagrams showing an example of the circuit configuration of the switch matrix 74. The circuits shown in these figures are combined to form a single switch matrix circuit. The circuits in these figures are shown using simplified designations, and FIGS. 17A and 17B are diagrams for explaining the designations. That is, the circuit shown in FIG. 17A in simplified form actually represents the circuit shown in FIG. 17B.

In these figures, SL-240, SL-300, SL-400, and FF iN-QX (N=1, 2, ..., 8; Q=0, 1, ..., 4) are input signals to the switch matrix 74, and FF oM-DaY (M=1, 2, ..., 5; Y=0, 1, ..., 7) are output signals from the switch matrix 74.

More specifically, SL-240, SL-300, and SL-400 are resolution selection signals, an appropriate one of which goes high depending on the low resolution print data to be corrected for jaggies; that is, SL-240 goes high when data of 240 dpi is input, SL-300 goes high when data of 300 dpi is input, and SL-400 goes high when data of 400 dpi is input.

The input signals FF iN-QX (N=1, 2, ..., 8; Q=0, 1, ..., 4) to the switch matrix 74 are the signals supplied from the corresponding Q outputs of the FF i1 to FF i8 in the input shift register 72 shown in FIG. 9. The output signals FF oM-DaY (M=1, 2, ..., 5; Y=0, 1, ..., 7) from the switch matrix 74 are the signals applied to the corresponding Da inputs of the FF o1 to FF o5 in the output shift register 76 shown in FIG. 9.

The operation of the switch matrix circuit 74 shown in FIGS. 16A, 16B, 16C, 16D, and 16E will be described by reference to the portion thereof shown in FIG. 17A. When the resolution of the low resolution print data input to the jaggy correction circuit is 240 dpi, the resolution selection signal SL-240 goes high, and an output signal from Q1 of FF i8 in the input shift register 72 is applied to Da4 of FF o5 in the output shift register 76.

Likewise, when the resolution of the low resolution print data input to the jaggy correction circuit is 300 dpi, the resolution selection signal SL-300 goes high, and an output signal from Q0 of FF i2 in the input shift register 72 is applied to Da4 of FF o5 in the output shift register 76. Further, when the resolution of the low resolution print data input to the jaggy correction circuit is 400 dpi, the resolution selection signal SL-400 goes high, and an output signal from Q2 of FF i7 in the input shift register 72 is applied to Da4 of FF o5 in the output shift register 76.

As described above, according to the present embodiment, since, in the input and output shift registers, data are shifted by at least 3-bit width, input data sequences of different data width can be converted into output sequences of prescribed data length while holding the operating frequency low for the shift registers that perform the data sequence conversion. At this time, by varying the distributing output rule in the switch matrix and the ratio of the shift clock frequencies for the input and output shift registers, input data sequences of different data widths can be handled. In the present embodiment, the output data of the data sequence conversion circuit has been described as being transferred directly to the LED array head; alternatively, the output data may be stored temporarily in a memory having a prescribed bit width.

The present embodiment has been described dealing with a printer having an LED array head, but the invention is applicable to any type of printer that has a line-like printhead and drives memory devices based on data loaded into a shift register.

As described above, according to the present invention, a plurality of data sequences input with different data widths can be converted into output data sequences of prescribed data width without converting the input data sequences into serial data, and at the same time, the clock frequency used for the data sequence conversion can be held low. This serves to achieve a low-cost, high-speed operating data sequence conversion circuit. This data sequence conversion circuit is particularly suitable for use in an LED printer or the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data sequence conversion circuit which takes as an input any one of a plurality of input data sequences having different data widths, and which converts said input data sequence into an output data sequence having a prescribed data width for output, said circuit comprising:

a first parallel shift register that receives parallel input data having a first data width, wherein the first parallel shift register receives a sequence of data elements respectively having the first data width and holds the sequence of data elements together in the first parallel shift register;

a switch matrix receiving the data held in said first parallel shift register as input data, and outputting said input data in a distributed fashion in accordance with a rule selected by a control signal from a plurality of predetermined rules; and a second parallel shift register receiving the data output from said switch matrix as input data, and outputting said input data as parallel output data having a second data width different from the first data width, wherein the second parallel shift register outputs said input data as a sequence of data elements respectively having the second data width.

2. A data sequence conversion circuit as claimed in claim 1, wherein when the data widths of said plurality of input data sequences are denoted by Wn (n=1, 2, 3, ...) respectively, and the data width of said output data sequence by Wo, said first parallel shift register has a data width at least equal to the largest value of Wn (n=1, 2, 3, ...), and has the number of stages at least equal to the largest value of the quotients QIn (n=1, 2, 3, ...) each obtained by dividing the least common multiple of Wn (n=1, 2, 3, ...) and Wo by Wn.

3. A data sequence conversion circuit as claimed in claim 1, wherein when the data widths of said plurality of input data sequences are denoted by Wn (n=1, 2, 3, ...), respectively, and the data width of said output data sequence by Wo, said second parallel shift register has the number of stages at least equal to the largest value of the quotients QOn (n=1, 2, 3, . . . ) each obtained by dividing the least common multiple of wn (n=1, 2, 3, . . . ) and Wo by Wo.

4. A data sequence conversion circuit as claimed in claim 1, wherein the data widths of said plurality of input data sequences are 5 bits, 4 bits, and 3 bits, respectively, the data width of said output data sequence is 8 bits, said first parallel shift register has a 5-bit data width and eight stages, and said second parallel shift register has five stages.

5. A data sequence conversion circuit as claimed in claim 1, wherein when the data width of said input data sequence is denoted by Wn, and the data width of said output data sequence by Wo, said switch matrix outputs said input data so that Wn×QIn units of data input and held in the first stage to the (QIn)th stage in said first parallel shift register as counted from the input side thereof are input to the first stage to the (QOn)th stage in said second parallel shift register as counted from the output side thereof, where QIn is the quotient of the least common multiple of Wn and Wo divided by Wn, and QOn is the quotient of the least common multiple of Wn and Wo divided by Wo.

6. A data sequence conversion circuit as claimed in claim 1, wherein when the data width of said input data sequence is denoted by Wn, and the data width of said output data sequence by Wo, the shift clock frequency Fi of said first parallel shift register and the shift clock frequency Fo of said second parallel shift register have a relation defined by Fi/Fo=Wo/Wn.

7. A data sequence conversion circuit as claimed in claim 1, wherein when the data width of said input data sequence is denoted by Wn, and the data width of said output data sequence by Wo, each time QIn data sequences are input into said first parallel shift register, Wn×QIn units of data are input into said second parallel shift register via said switch matrix, following which QOn data sequences are output from said second parallel shift register.

8. A printer comprising a data sequence conversion circuit as claimed in claim 1, said data sequence circuit being located between a jaggy correction circuit and a line-like printhead.

* * * * *